United States Patent
Walsh et al.

(10) Patent No.: US 11,526,572 B2
(45) Date of Patent: Dec. 13, 2022

(54) SYSTEM AND METHOD FOR ETHICAL COLLECTION OF DATA

(71) Applicant: Acxiom LLC, Conway, AR (US)

(72) Inventors: Brandy Walsh, Fayetteville, AR (US); Geri Paquette, North Little Rock, AR (US); Todd Thomas, Little Rock, AR (US); Bryan Donovan, Holden, MA (US)

(73) Assignee: Acxiom LLC, Conway, AR (US)

( * ) Notice: Subject to any disclaimer, the term of this patent is extended or adjusted under 35 U.S.C. 154(b) by 0 days.

(21) Appl. No.: 17/281,088

(22) PCT Filed: Jun. 12, 2020

(86) PCT No.: PCT/US2020/037491
§ 371 (c)(1),
(2) Date: Mar. 29, 2021

(87) PCT Pub. No.: WO2021/025785
PCT Pub. Date: Feb. 11, 2021

(65) Prior Publication Data
US 2021/0334329 A1    Oct. 28, 2021

Related U.S. Application Data

(60) Provisional application No. 62/884,025, filed on Aug. 7, 2019.

(51) Int. Cl.
*G06F 16/955* (2019.01)
*G06F 16/9032* (2019.01)
*G06N 20/00* (2019.01)

(52) U.S. Cl.
CPC .... *G06F 16/9566* (2019.01); *G06F 16/90332* (2019.01); *G06N 20/00* (2019.01)

(58) Field of Classification Search
CPC ............ G06F 16/9566; G06F 16/90332
See application file for complete search history.

(56) References Cited

U.S. PATENT DOCUMENTS

| 2004/0204952 A1 | 10/2004 | Rochet |
| 2005/0022031 A1* | 1/2005 | Goodman ............... H04L 51/12 726/4 |

(Continued)

OTHER PUBLICATIONS

De Groot et al., "Studying Problematic Online Behavior of Adolescents with Mild Intellectual Disabilities and Borderline Intellectual Functioning: Methodological and Ethical Considerations for Data Collection," Int'l J. of Qual. Methods (Jun. 24, 2019).

*Primary Examiner* — Taelor Kim

(57) ABSTRACT

A computerized system automatically ensures that data from a data partner has been ethically sourced. The system reviews websites associated with URLs provided by the data provider, and privacy policy data is extracted and captured. A keyword set is used to analyze the privacy terms of websites associated with the URLs. URLs associated with websites that ethically collect data are stored in a URL database, or the URLs are given a flag or score, such that these URLs need not be checked each time a new data partner identifies these URLs as the source of its data. The system may periodically re-check the URLs to ensure that no changes have been made to the corresponding website's data collection practices.

12 Claims, 3 Drawing Sheets

(56) References Cited

U.S. PATENT DOCUMENTS

| | | | |
|---|---|---|---|
| 2006/0075122 A1* | 4/2006 | Lindskog | H04L 63/0823 |
| | | | 709/228 |
| 2007/0005652 A1* | 1/2007 | Choi | G06F 16/955 |
| | | | 707/E17.112 |
| 2009/0144255 A1* | 6/2009 | Chow | G06F 21/6218 |
| | | | 707/999.005 |
| 2009/0210417 A1* | 8/2009 | Bennett | G06F 16/951 |
| | | | 707/999.005 |
| 2015/0081562 A1 | 3/2015 | Roullier et al. | |
| 2015/0081602 A1 | 3/2015 | Talley et al. | |

\* cited by examiner

SYSTEM AND METHOD FOR ETHICAL COLLECTION OF DATA

BACKGROUND OF THE INVENTION

Marketing services providers (MSPs) exist to assist their clients with many aspects of marketing campaigns, including multi-channel marketing campaigns. Channels may include, for example, email, web, direct mail, and digital television. In providing these services, the MSPs may, for example, perform customer data integration, data enhancement, data hygiene and quality improvements, deduping, database marketing, prospecting, marketing campaign management, data analytics, and related services. All of these services are driven by the data maintained by the MSP pertaining to consumers. In order to access the consumer data that drives the services offered by MSPs, many MSPs will enter into partnership arrangements with consumer data brokers. Some MSPs may have partnership arrangements with a great many different data brokers in order to provide the most comprehensive solution suite for their clients.

MSPs must take steps to ensure that the data provided to them by data partners is ethically sourced. This process is extremely time consuming and expensive. A single data partner may have collected data from tens of thousands of websites associated with particular uniform resource locators (URLs). Considering that there may be a large number of data partners each of whom collect data from a very large number of URLs, it is not feasible for the MSP to individually check each URL by hand to ensure that the data collected there is ethically sourced under an appropriate privacy policy. By the time a manual check of this nature were completed, the data would no longer be sufficiently fresh to be useful. This problem becomes even more complex when one considers that the privacy policies at any of these URLs are not set in stone and thus may change at any time, which requires periodic re-checking. By the time any manual check was completed, it is quite possible that some of the privacy policies of the associated URLs would have changed, rendering the effort pointless.

Nevertheless, the process that MSPs use to ensure that their data is ethically sourced has traditionally been performed by hand because there is no alternative. Each data partner fills out a form listing the URLs for its data sources, and then personnel at the MSP check each of those URLs individually. This is very costly to the MSP, because of the large number of employee hours that must be dedicated to this task. The delay caused by the hand checking of URLs means that MSPs must wait before using the newest and potentially most accurate sources of data, thereby degrading the quality of the product eventually delivered to the MSP's clients. This creates particular difficulty with respect to data that must be acted on quickly, such as, for example, an indication that a consumer is currently in the market seeking a particular product. Finally, the manual process makes it impossible to continually check the data-source URLs to see if any policies have changed, which degrades the quality of the process for checking the data, and increasing the chance that unethically sourced data may be allowed into the MSPs systems. Only occasional periodic checks are feasible. In the world of today where data is most valuable when it is most fresh, where labor costs continue to rise, and where penalties for the use of unethically sourced data (even if accidental) continue to increase, the manual method of checking data sources is simply no longer an option. What is desired is an automated system and method for ensuring that data is ethically sourced, which provides results quickly enough that fresh data can be acted upon right away, and that continually checks the URLs for data provided by data partners in order to quickly identify any change in privacy policies that would demonstrate that the data may no longer have been collected and stored in an ethical manner.

References mentioned in this background section are not admitted to be prior art with respect to the present invention.

BRIEF SUMMARY OF THE INVENTION

The present invention is directed to an automated software-implemented system and method for use by an MSP to ensure that data from a data partner has been ethically sourced. The software continuously reviews active data source URLs to ensure that the data may ethically be used in a marketing campaign. Source and privacy data is extracted and captured for each of the great many URLs from which data partners may source data, and this information is analyzed and stored in a particular structure for future use. In certain implementations, a keyword set is used to analyze the privacy terms of websites associated with the URLs. In certain implementations, a keyword set database may be used to track keywords for this purpose. URLs associated with websites that ethically collect data are stored in a URL database, such that these URLs need not be checked each time a new data partner identifies these URLs as the source of its data. Alternatively, all checked URLs may be maintained in the database with additional information pertaining to their associated policies, such as flags indicating ethical sourcing or a score reflective of the ethics used in sourcing the data. Also, in certain implementations, the system may periodically re-check the URLs in the URL database to ensure that no changes have been made to the corresponding website's data collection practices that would indicate the data is no longer being ethically sourced. This check may be scheduled to run on a particular schedule, may be run when resources are available, or even may be constantly re-run to ensure that the latest privacy information is available for each corresponding URL.

These and other features, objects and advantages of the present invention will become better understood from a consideration of the following detailed description in conjunction with the drawings.

DRAWINGS

DETAILED DESCRIPTION OF THE PREFERRED EMBODIMENT(S)

Figure 1:
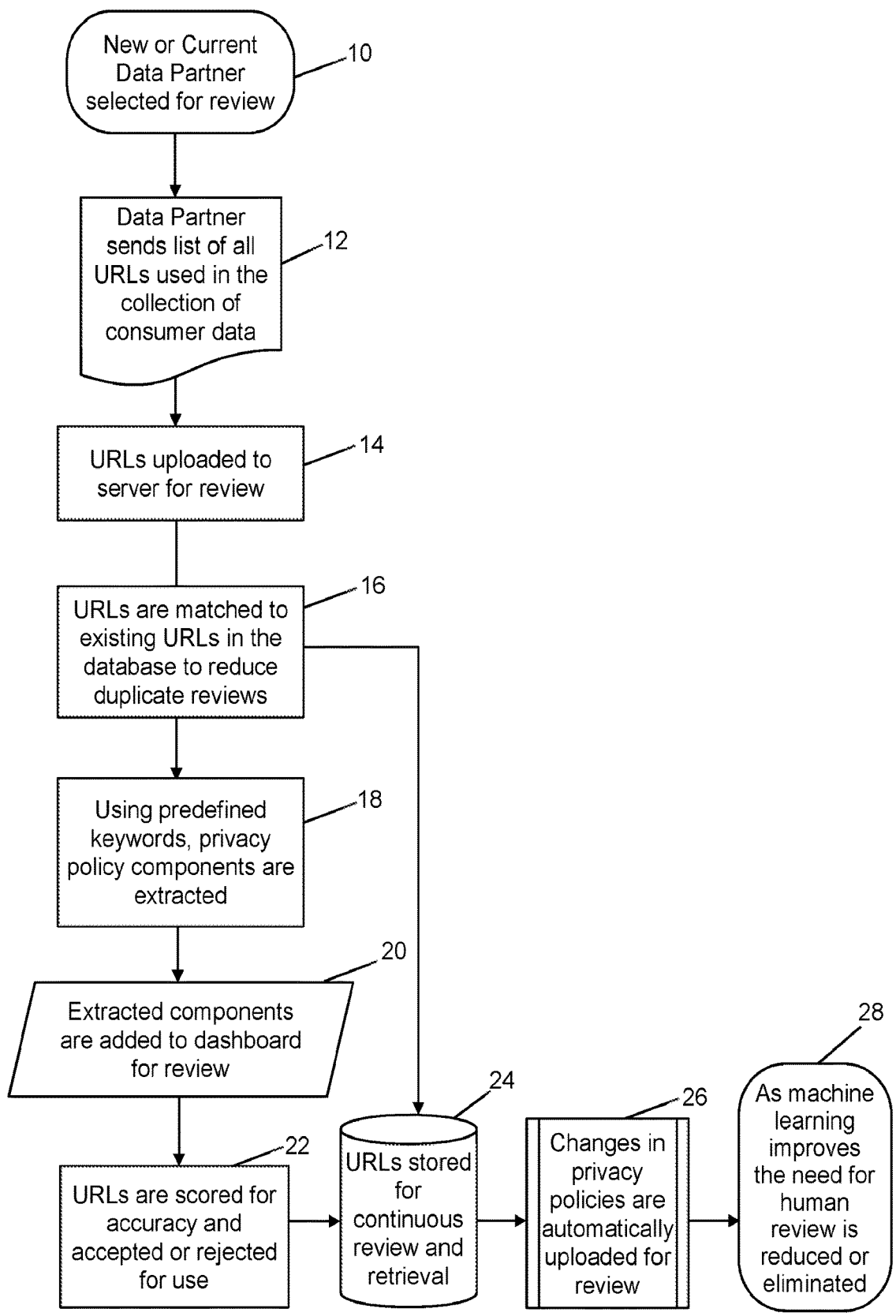
FIG. 1 is a process flow diagram according to a first implementation of the present invention.

Before the present invention is described in further detail, it should be understood that the invention is not limited to the particular embodiments described, and that the terms used in describing the particular embodiments are for the purpose of describing those particular embodiments only, and are not intended to be limiting.

Before the software-implemented automated portions of the process take place, the process begins by presenting a series of questions to a potential data partner. The data partner may log-in to the software managing the process, and the questions may be presented in a sequential form. The questions to be asked of potential data partners may vary depending upon whether the potential data partner is a domestic entity or an international entity. A non-limiting sample set of questions to be presented to a domestic entity is as follows:

COMPANY AND CONTACT INFORMATION
Date:
Company Name:
Address:
Company Website:
Contact Person:
Contact Email:
Contact Phone Number:
Number of Years in Business:

DATA INFORMATION
1. Please give a general description of the data you'll be providing to the MSP.
2. Please attach a record layout or data dictionary that shows all data elements you have available. The layout should include counts and values for each element (or each value within an element). For example, for age range, please provide the estimated ranges you have and the counts per range.
3. What hygiene processes do you perform on your file (e.g., address cleaning, NCOA, opt-out suppression, etc.) and how often?

DATA SOURCING
1. Are you the originator of the data or an aggregator, or both?
2. What is the data's point of origin and how is the data collected? (e.g., online, offline, call center, warranty card, survey, retail transaction, etc.)
3. In what country (or countries) did the data originate?
4. Do you reference a privacy policy during the collection of your data? Please provide a URL to your privacy policy.
5. Is the individual given notice in your privacy policy or elsewhere during the data collection process about the transfer and use of their data by third parties?
6. Do you (or the data collector) provide a mechanism by which individuals can individual expressly "opt-in"? If so, to what does the individual opt-in (e.g., data transfer to third parties, mobile marketing campaign, email marketing campaign, etc.)?
7. Do you (or the data collector) provide a mechanism by which the individual can exercise choice to "opt-out" or prevent transfer of their data to third parties?
8. Does the data collected contain any information on children (i.e. anyone under 13 years or between 13-17 years)? If your answer is "Yes", will you be providing that data to the MSP?
9. If you're not the originator of the data, please specifically identify any contractual limitations between you and your data sources that impact your ability to supply data to the MSP, if applicable.

CALIFORNIA DATA SOURCING
1. Will you be providing to the MSP the "personal information" of California residents as defined in the California Consumer Privacy Act ("CCPA")? As a guide, please see the CCPA definition of "personal information" provided below. Please note that this definition is subject to change at any time by the California legislature. Definition of Personal Information: Personal information is information that identifies, relates to, describes, is capable of being associated with, or could reasonably be linked, directly or indirectly, with (1) a particular consumer (including, but not limited to, his or her real name, alias, signature, social security number, physical characteristics or description, postal address, physical address, unique personal identifier, online identifier, Internet Protocol address, email address, account name, social security number, driver's license number, passport number, telephone number, passport number, driver's license or state identification card number, insurance policy number, education, employment, employment history, bank account number, credit card number, debit card number, or any other financial information, medical information, health insurance information or other similar identifiers) OR (2) household.
2. Is your company's consumer-facing privacy notice pursuant to the requirements of the CCPA, if applicable?

ONLINE AND/OR MOBILE DATA SOURCING
1. Was any part of the file sourced online or from a mobile device? If the answer is "No", please skip questions 2-4 in this section.
2. Please provide a general description of how the data is collected online, both directly from the individual, and by automated means (e.g. data entry fields completed by site visitor, cookies, mobile SDKs, API feed, crawler, web scrape, etc.)
3. How was the individual informed about the data collected that was not intentionally provided by the individual (e.g., through a posted privacy policy, in a pop-up box, etc.)?
4. If you're an aggregator and not the original collector of the data you are sharing, please provide the names of the top 100 URLs data producers you source data from OR the top 10% of URLs from which individual data is collected by record count, whichever number is greater.

REGULATORY/COMPLIANCE INFORMATION
1. Has your company been part of a government inquiry or investigation? If so, please describe.

A sample set of questions to be presented to an international entity is as follows:

COMPANY AND CONTACT INFORMATION
Date:
Company Name:
Address:
Country:
Do you have any relevant decision-making presence in the EU?
Company Website:
Contact Person:
Contact Email:
Contact Phone Number:
Number of Years in Business:

DATA INFORMATION
1. Please give a general description of the data.
2. Please attach a record layout to this document that shows all data elements you have available. The layout should include counts and values for each element (or each value within an element). For example, for age range, please provide the estimated ranges you have and the counts per range.
3. What hygiene do you perform on your file (e.g., address cleaning, NCOA, opt-out suppression, etc.)?
4. Will all data collected be available to the MSP? If no, what is not available?
5. Please specifically identify any contractual limitations between you and your data sources that impact your ability to supply data to the MSP, if applicable.

6. If you're not the originator of the data, please specifically identify any contractual limitations between you and your data sources that impact your ability to supply data to the MSP, if applicable.
7. Please list the self-regulatory organizations to which your company currently subscribes or maintains membership.
8. Will you be supplying us with any of the following types of data which are either considered legally sensitive and/or fall under the MSP's restricted data categories? If so, which ones and what extra precautions are taken to inform the consumer at the point of data collection?
9. Please indicate below any specific consumer privacy laws applicable to the proposed data set.

DATA SOURCING

1. Are you the originator of the data or an aggregator, or both?
2. What is the data's point of origin and how is the data collected? (e.g., online, offline, call center, warranty card, survey, retail transaction, etc.)
3. In what country (or countries) did the data originate? (Please list out all countries)
4. If you are a data aggregator, please describe measures you take, in addition to contractual terms, to ensure that your data supplier has taken appropriate measure to ensure legal compliance (for instance due diligence, audit, verification of certification etc.).
5. Do you reference a privacy policy during the collection of your data? Y/N. Please provide a URL to your privacy policy.
6. Please answer the following questions regarding Notice and Choice:
   a. Can users express their preference through www.youronlinechoices.com?
   b. Is the data you are supplying to the MSP collected with consumer/individual consent (opt-in)?
   c. If the answer to the question above is "yes", to what does the individual opt-in (e.g., data transfer to third parties, mobile marketing campaign, email marketing campaign, etc.)?
   d. If the answer to the question 16.a. above is "yes", is the consent collected using the Transparency and Consent Framework (TCF)?
   e. Are records being kept to document what the individual has consented to (including what they were told, and when and how they consented)?
   f. If the answer to the question above is "yes", will such records be readily available to the MSP if and when requested?
   g. Since opt-in/consent is not the only legal ground for collecting data, is the data you are supplying collected with legitimate interest as legal basis?
   h. If the answer to the question above is "yes", please explain why yours and our collective legitimate interests override those of the data subjects.
   i. Are individuals given notice regarding the transfer and use of their data by third parties?
   j. Do you provide a mechanism by which individuals can exercise choice to "opt-out" or prevent transfer of their data to third parties?
   k. Do your data sources (if applicable) provide a mechanism by which individuals can exercise choice to "opt-out" or prevent transfer of their data to third parties?
   l. Does the data collected contain any information on children (i.e. anyone under 13 years or between 13-17 years)?
   m. If your answer is "Yes", will you be providing that data to the MSP?
7. Do you subscribe to any EU self-regulatory schemes? Please only list those that are valid at the moment of filling out this form:
8. Are you certified for your privacy and/or security practices? Please only list those that are valid at the moment of filling out this form:

ONLINE AND/OR MOBILE DATA SOURCING

1. Was any part of the file sourced online and/or from a mobile device?
   If your answer is "no" please skip the rest of this section and go to government inquiries. If "yes", please provide a percentage of the file that was sourced online or from a mobile device.
2. Please provide a general description of how the data is collected online, both directly from the individual, and by automated means (e.g. data entry fields completed by site visitor, cookies, mobile SDKs, API feed, crawler, web scrape, etc.)
3. How was the individual informed about the data collected that was not intentionally provided by the individual (e.g., through a posted privacy policy, in a pop-up box, etc.)?
4. If you are supplying location data, please answer the following questions:
   a. Please indicate the frequency of data collection (in what intervals data are collected).
   b. Is a notice provided to users, prior to their location data being collected, to explain that their location data will be shared/used for third party marketing purposes?
5. If you're an aggregator and not the original collector of the data you are sharing, please provide the names of the top 100 URLs data producers you source data from OR the top 10% of URLs from which individual data is collected by record count, whichever number is greater.

GOVERNMENT INQUIRIES

1. Has your company been part of a government inquiry or investigation?
   If so, please describe.

This information is subject to update as conditions change, such as the introduction of new privacy regulations or changes to existing privacy regulations. The answers received back from the questionnaire are reviewed in order to identify obvious up-front problems. If there are no such issues, then the information is input into the software-implemented machine-learning system for ensuring that ethical data is being provided.

Figure 2:
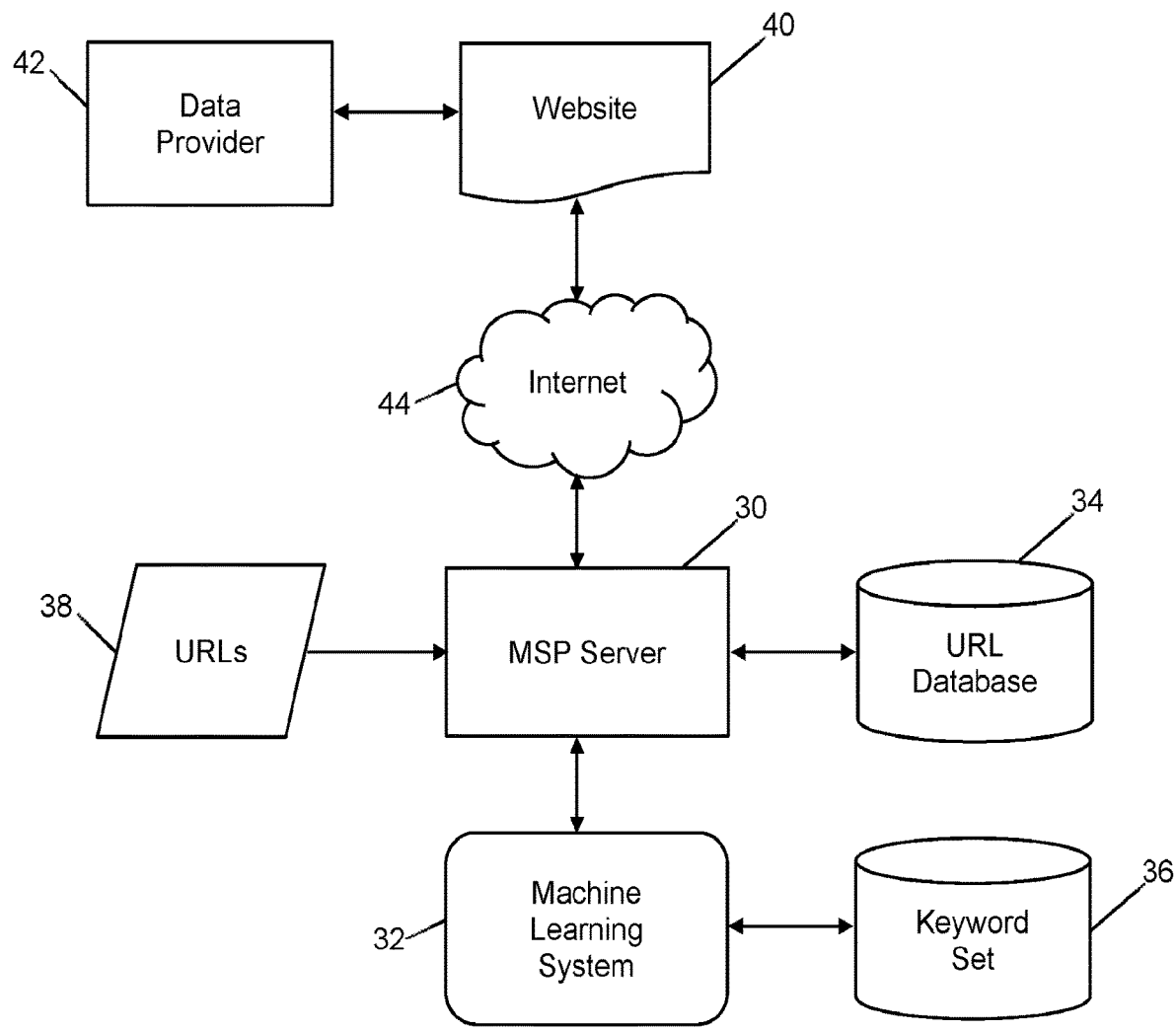
FIG. 2 is a system architecture diagram according to an implementation of the present invention.

FIG 2 illustrates a particular implementation of a system for performing this automated process. A marketing services provider (MSP) server 30 provides a central processing server for the marketing services provider. It communicates with machine learning system 32, which will provide artificial intelligence processing for the system as described below. Machine learning system 32 takes various inputs, whether actual inputs or training inputs, and learns to identify privacy policies that are indicative of ethical data sourcing. It may also derive a score for the level of ethics involved in data collection at a particular website and/or create a flag indicating a site that ethically sources data. The MSP server 30 receives a list of URLs 38 as an input, and maintains a database 34 of URLs for approved (or, alternatively, reviewed and scored or flagged) websites. The machine learning system 32 utilizes a keyword set 36, containing keywords and potentially key phrases for the review of privacy policies. These are applied against websites 40 that correspond to URLs in URL database 34, with websites 40 being accessed through the MSP server 30 across a network such as Internet 44. Each data provider 42 connects to one or more of the websites 40 because that is the means through which data provider 42 collects its data. The data provider 42 also has a connection (not shown) to MSP server 30 in order to provide the data it has collected for use by the MSP, and also to provide to the MSP server 30 the URLs from which this data has been collected.

Referring now to FIG. 1 to describe a process for using the system of FIG. 2, it may be seen that after step 10 in which the data partner is selected and step 12 where the URL data 38 is collected (by means of the foregoing forms or otherwise), then processing moves to step 14, during which the URLs that have been identified are uploaded to the MSP server 30 for review by the machine-learning system 32 that powers the automated portion of the processes from here forward.

The machine-learning system 32 of the MSP maintains a URL database 34 of URLs that it has already cleared as being ethical sources of data. At step 16, the machine-learning system first checks to see, for each URL provided to the server by the potential partner being reviewed, whether such URL has already been reviewed and passed as an ethical data source by the system according to URL database 34. Alternatively, URL database 34 may retain information for all URLs that have been checked, along with the score assigned to those URLs or a Boolean flag indicating whether or not the URL was accepted for use. In that case, the check to database 34 is a check to see if the appropriate score (i.e., meeting the threshold score) or flag is presented to indicate that data from the URL of interest is acceptable for ethical use. If so, then no further review of the URL is undertaken here. This step eliminates the duplication that would otherwise result in checking URLs, because many potential data source partners may be using overlapping sets of URLs in order to collect data, and thus previous manual systems required re-checking of the same URLs many times over.

At step 18, the machine-learning system scans the material available at website 40 associated with a given URL using predefined keywords in order to extract the pertinent privacy policy components from the URL, that is, those privacy policy components that are indicative of whether the data provided at the URL was ethically sourced. (It will be understood that although a single website 40 is illustrated, the system contemplates a great many data providers 42 and associated websites 40 may be employed, and further that multiple websites 40 may be associated as a data source for a particular data provider 42. There may be, for example, hundreds of data providers 42 and tens of thousands of websites 40.) Note again that the URL for website 40 was provided by data provider 42, which has indicated that it is using data collected through website 40. The machine-learning system 32 may be initially seeded by a predefined keyword set stored in keyword database 36, but over time the system may learn additional keywords that are useful in this process on its own by inputting words from privacy policies that are found to be associated with ethical data. This information may be stored in the keyword set database 36 by machine learning system 32 on an ongoing basis. Training websites may be used for this purpose in a fashion intended for use in machine learning systems. Once the privacy policy components are extracted, they are added to a dashboard graphical user display for review by the MSP at step 20. This review may initially be performed by humans, but eventually the review is performed by the machine-learning system 32 and the graphical display may, alternatively, simply display the results of the process for a human reader.

At step 22, the URLs are assigned a score for their privacy policy components. This review and scoring is performed by the machine-learning system 32. The system improves its accuracy over time through feedback on its results periodically provided by humans. Based on the score, the URLs are either accepted or rejected for use, with those having a score at or above a threshold score being accepted. Those that have been accepted for use are then written to the database 34 at step 24, so that once these URLs have been approved they need not be checked again when a new partner is being evaluated.

At step 26, URLs that have already been approved are re-reviewed by the machine learning system 32 in order to determine if any relevant changes have taken place with respect to the URL's privacy policy. These re-reviews may be performed on a periodic basis, or they may be run whenever the system has hardware resources available to perform these re-reviews, or there may even be dedicated systems within machine learning system 32 to continually re-review each of the URLs in URL database 34. If there are no changes, then no change is made to the information in database 34. If there are changes, then processing returns to step 22 in order to re-score or reevaluate the URL. In the case where only those URLs associated with websites that ethically source data are stored in URL database 34, then any URL that is found to be associated with a website that no longer ethically sources data may be deleted from database 34. In those cases where all URLs are retained but a Boolean flag is used to indicate ethical compliance, then the flag may be changed. In those cases where all URLs are retained and a score is maintained for the URL that indicates ethical compliance, then the old score may be overwritten with a new score.

The processing of the machine-learning system completes at step 28. It will be understood that as the machine learns from performing evaluations of potential partners and the URLs used by those potential partners for collecting their data, that human input will gradually become less and less important. Eventually, it is anticipated to be possible to entirely eliminate human involvement in all steps of this process as illustrated in FIG. 1.

Figure 3:
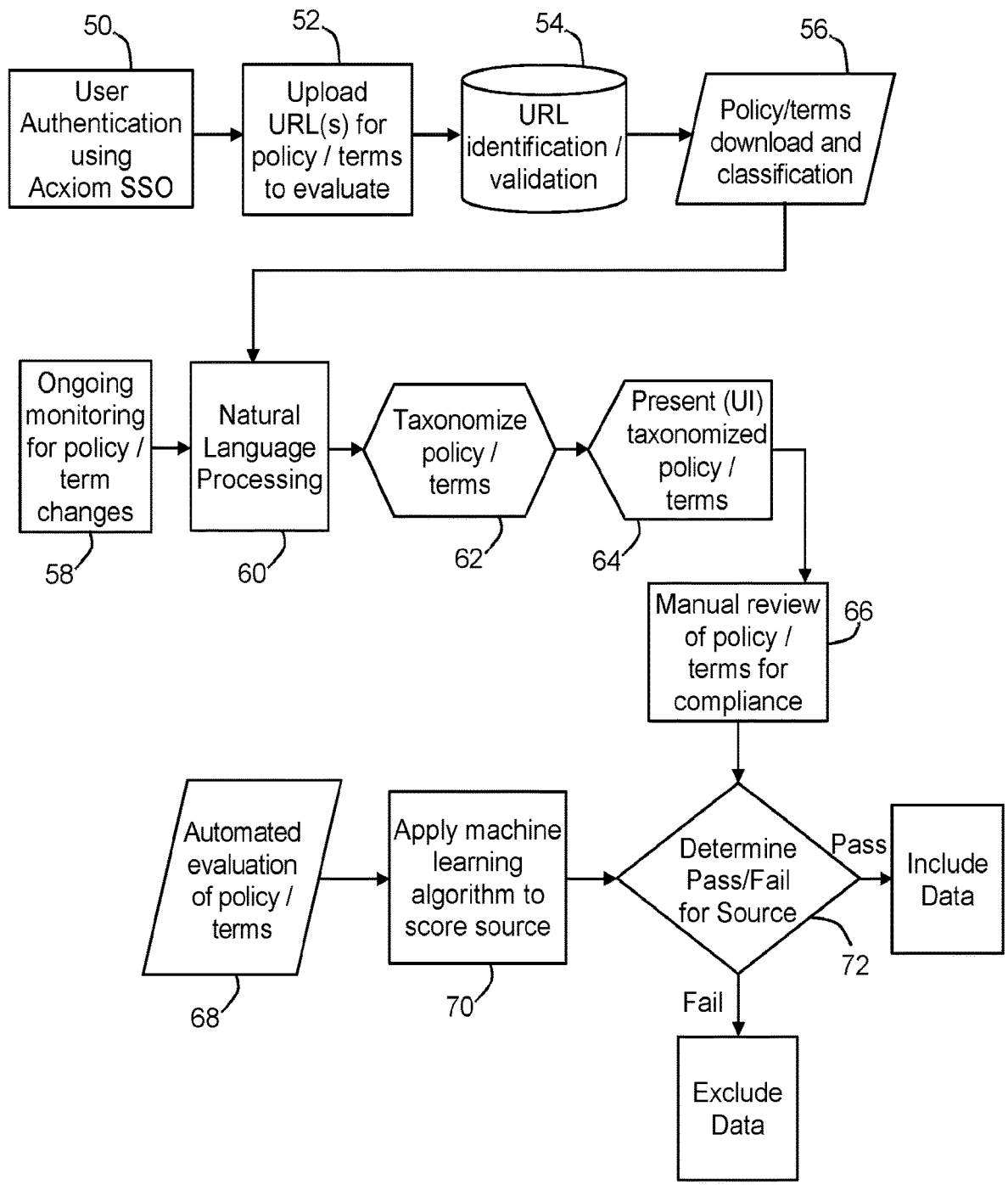
FIG. 3 is a process flow diagram according to a second implementation of the present invention.

Referring now to FIG. 3, a second process for implementing the invention may now be described. At step 50, user authentication is performed, in one implementation using single sign-on (SSO) technology. At step 52, the one or more URLs are uploaded for evaluation of policies and terms. It should be noted here that there is a distinction between the policies and the terms of a website associated with the URL. A policy is meant to cover consumer privacy policies specifically, which includes information collection, use, sharing, opt-outs, etc. Terms is meant to cover website terms and conditions which cover appropriate uses of the site (and information on it) and user/usage agreements. In some cases, the data being evaluated is harvested from the website and in those cases the terms are reviewed to ensure nothing prevents intended uses of the corresponding data. At step 54, URL identification/validation is performed. Specifically, the system reviews the input for proper URL formatting and will make a call to the website to get a response and confirm that the domain is in fact active. Any domains that cannot be validated as active will be captured in an exception report for further research. The policies and terms are then downloaded for validated domains at step 30. Once downloaded, they will be classified as either privacy policies or terms and conditions, with each being tied to one or more data partners under which the evaluation is being performed. This will generate a time stamp and a new entry in the corresponding database for each document.

Step 58 is the periodic determination of sourcing policy. The system will re-capture all active policies and terms under new management. If changes in text are detected from the previous policies and terms, the download and classification process will start again. If the text has not changed, the system will create a timestamp entry of the review and indicate that no changes were detected. In either case, processing then continues to step 60, where natural language processing (NLP) techniques are applied to understand the context of the privacy policies to extract data points necessary in approving or rejecting a certain source. By creating neutral network understandable data points on why/how a certain policy was rejected or approved, the AI model will learn the semantics and over time will be able to automatically adjudicate rejection or approval without manual intervention.

At step 62, the policies and terms are taxonomized. The system uses established key elements that need to be present in the policy, and the processing will identify, capture and present that specific text within the predefined taxonomy to enable both human and machine review. In this way, the process is standardized for various text and phrases within a policy that enables or prevents data use. The taxonomized policy and terms may then be presented through a user interface (UI) at step 64. The UI is used at step 66 so that human reviewers may examine the policies for language that allows or prevents the sharing of data with third parties. In this case, the system is doing much of the preparatory work to surface the relevant text in an easy to navigate taxonomy. These human reviews will form the basis for the training data set necessary to enable machine scoring. It should be understood that after a period of time when the machine learning system has matured using the input from manual review at step 66, the manual step may eventually be eliminated entirely.

Once the system has matured such that human review is no longer required, processing will move instead to step 90, where instead of surfacing text for human review through a UI, the data points are extracted and processed through the machine-learning algorithm to produce a quantified output, i.e., a score, on how closely the policy meets the approved and failed policies contained within the learning set at step 70. In either the manual or machine-learning automated case, at decision block 72 it is determined whether the policy contains language that prevents or permits the sharing of consumer data with third parties, and whether the terms allow for or prevent commercial use of the data. A pass indicates that the data may be included in campaigns, while a fail indicates that the data will be excluded.

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included in the disclosure. When a range is mentioned herein, the disclosure is specifically intended to include all points in that range and all sub-ranges within that range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention.

The invention claimed is:

1. A computerized method for confirming that personal data has been ethically collected, comprising the steps of:
at a personal data provider server, collecting personal data through a plurality of data collection websites, wherein each of the plurality of data collection websites is configured to receive personal data from consumers, and further wherein each of the plurality of data collection websites is associated with one of a plurality of data collection uniform resource locators (URLs);
uploading from the data provider server to a marketing services provider (MSP) server the plurality of data collection URLs, each of the plurality of data collection URLs corresponding to one of the data collection websites from which the data provider server has previously collected personal data from consumers;
searching a URL database for a match with each of the plurality of data collection URLs, wherein the URL database comprises a plurality of assessed URLs, wherein each of the assessed URLs corresponds to a website about which the MSP server has previously assessed ethical data collection practices, and wherein the URL database further comprises a Boolean flag or score associated with each assessed URL indicative of whether the website associated with the assessed URL engaged in ethical data collection practices, wherein ethical data collection comprises the collection of personal data under a privacy policy in compliance with legal standards;
for each data collection URL from the plurality of data collection URLs for which no match is found in the URL database, utilizing a machine learning system to extract privacy policy components pertaining to whether personal data was ethically sourced from a website privacy policy corresponding to such one of the plurality of data collection URLs;
for each data collection URL from the plurality of data collection URLs for which no match is found in the URL database, matching the extracted privacy policy components from the corresponding website privacy policy against a privacy policy keyword set to determine if the website privacy policy comports with ethical data collection practices based on the presence of keywords from the keyword set in the extracted privacy policy components; and
for each data collection URL from the plurality of data collection URLs for which no match is found in the URL database, either adding the data collection URL to the URL database if the website privacy policy comports with ethical data collection practices or adding the data collection URL to the URL database with an associated Boolean flag or a calculated score indicative of a level of unethical data collection practices for the website privacy policy if the website privacy policy does not comport with ethical data collection based on the matching of the privacy policy components with the keyword set.

2. The computerized method of claim 1, wherein the step of, for each data collection URL from the plurality of data collection URLs for which no match is found in the URL database, reviewing the extracted privacy policy components from the corresponding website to determine if the privacy policy comports with ethical data collection comprises the step of searching such corresponding website for predefined keywords indicative of data collection practices in compliance with legal standards.

3. The computerized method of claim 2, wherein the predefined keywords are drawn from a keyword set database in communication with the machine learning system.

4. The computerized method of claim 3, further comprising the step of training the machine learning system by presenting a plurality of training websites to the machine learning system and identifying to the machine learning system which of the training websites are associated with ethical collection of data.

5. The computerized method of claim 4, further comprising the step of the machine learning system extracting additional keywords from training websites associated with ethical collection of data and updating the keyword set database by adding the extracted additional keywords to the keyword set database.

6. The computerized method of claim 1, wherein the step of, for each data collection URL from the plurality of data collection URLs for which no match is found in the URL database, reviewing the extracted privacy policy components from the corresponding website to determine if the privacy policy comports with ethical data collection comprises the step of scoring each data collection URL based on compliance with legal standards.

7. The computerized method of claim 6, wherein the step of scoring each data collection URL comprises the step of determining if the data collection URL score meets or exceeds a threshold score.

8. The computerized method of claim 6, wherein the step of adding the data collection URL to the URL database further comprises the step of associated the data collection URL score with the data collection URL in the URL database.

9. The computerized method of claim 6, wherein the step of adding the data collection URL to the URL database further comprises the step of associating a flag with the data collection URL in the URL database, wherein the flag is a Boolean indicator of whether the corresponding website for such data collection URL has ethically sourced data.

10. The computerized method of claim 1, further comprising the steps of, for each assessed URL in the URL database:
   utilizing the machine learning system to extract privacy policy components from the privacy policy of the website corresponding to such one of the plurality of URLs;
   utilizing the machine learning system to review the extracted privacy policy components from the corresponding privacy policy to determine if the privacy policy comports with applicable legal standards; and
   retaining the assessed URL in the URL database if the privacy policy of the corresponding privacy policy comports with ethical data collection, or removing the assessed URL from the URL database if the privacy policy of the corresponding privacy policy no longer comports with applicable legal standards.

11. The computerized method of claim 10, wherein the steps of utilizing the machine learning system to extract privacy policy components from the privacy policy corresponding to such one of the plurality of assessed URLs, reviewing the extracted privacy policy components from the corresponding privacy policy to determine if the privacy policy comports with applicable legal standards, and retaining the assessed URL in the URL database if the privacy policy of the corresponding privacy policy comports with applicable legal standards, or removing the assessed URL from the URL database if the privacy policy of the corresponding privacy policy no longer comports with applicable legal standards, are automatically performed on a periodic basis.

12. The computerized method of claim 11, further comprising the step of building a human-readable display comprising changes in the privacy policy for at least one of the plurality of assessed URLs.

* * * * *